(12) United States Patent
Neitemeier et al.

(10) Patent No.: US 10,292,321 B2
(45) Date of Patent: May 21, 2019

(54) AGRICULTURAL WORK MACHINE FOR AVOIDING ANOMALIES

(71) Applicant: CLAAS Selbstfahrende Erntemaschinen GmbH, Harsewinkel (DE)

(72) Inventors: Dennis Neitemeier, Lippetal (DE); Thilo Krause, Glinde (DE); Timo Korthals, Bielefeld (DE); Andreas Skiba, Bielefeld (DE); Boris Kettelhoit, Gütersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 15/697,892

(22) Filed: Sep. 7, 2017

(65) Prior Publication Data

US 2018/0084708 A1    Mar. 29, 2018

(30) Foreign Application Priority Data

Sep. 27, 2016   (DE) .................. 10 2016 118 227

(51) Int. Cl.
 *G06K 9/00*  (2006.01)
 *A01B 69/00*  (2006.01)
 (Continued)

(52) U.S. Cl.
 CPC .......... *A01B 69/001* (2013.01); *A01B 69/008* (2013.01); *A01B 79/005* (2013.01);
 (Continued)

(58) Field of Classification Search
 CPC ... A01B 69/001; A01B 69/008; A01B 79/005; G06K 9/00805; G06K 9/6267;
 (Continued)

(56) References Cited

U.S. PATENT DOCUMENTS 6,336,051 B1 * 1/2002 Pangels ................ A01B 79/005
                                                  700/207
7,978,918 B2 * 7/2011 Scalise ............... G06K 9/00234
                                                   348/77

(Continued)

FOREIGN PATENT DOCUMENTS

EP         2 143 316 A1    1/2010

OTHER PUBLICATIONS

European Search Report for European Patent Application No. EP17171198 dated Oct. 30, 2017; 10 pages.
(Continued)

*Primary Examiner* — Tom Y Lu
(74) *Attorney, Agent, or Firm* — Lempia Summerfield Katz LLC

(57) ABSTRACT

An agricultural work machine configured to avoid anomalies is disclosed. Agricultural work machines may encounter anomalies, such as obstacles (e.g., tires) or irregularities in the crop (e.g., weeds), which can reduce the quality of the harvested crop. Manually steering the agricultural work machine requires the constant attention of the vehicle operator. Thus, the agricultural work machine is configured to include sensors to generate one or more images (such as images of various regions of the agricultural work machine), an image processing system to process the images and a control unit to avoid the anomalies (e.g., avoid the identified anomalies, to drive in tracks, and/or to stop the agricultural work machine).

20 Claims, 8 Drawing Sheets

(51) Int. Cl.
| | |
|---|---|
| *G06T 7/11* | (2017.01) |
| *G06T 7/90* | (2017.01) |
| *A01B 69/04* | (2006.01) |
| *G06K 9/62* | (2006.01) |
| *G06T 7/00* | (2017.01) |
| *A01B 79/00* | (2006.01) |
| *G06K 9/42* | (2006.01) |
| *G06K 9/46* | (2006.01) |

(52) U.S. Cl.
CPC ..... *G06K 9/00664* (2013.01); *G06K 9/00805* (2013.01); *G06K 9/42* (2013.01); *G06K 9/46* (2013.01); *G06K 9/6267* (2013.01); *G06K 9/6269* (2013.01); *G06T 7/0004* (2013.01); *G06T 7/11* (2017.01); *G06T 7/90* (2017.01); *G06T 2207/10024* (2013.01); *G06T 2207/30188* (2013.01); *G06T 2207/30261* (2013.01)

(58) Field of Classification Search
CPC ........ G06K 9/00664; G06K 9/42; G06K 9/46; G06K 9/6269; G06T 2207/10024; G06T 2207/30188; G06T 2207/30261; G06T 7/0004; G06T 7/11; G06T 7/90
See application file for complete search history.

(56) References Cited

U.S. PATENT DOCUMENTS

| | | | |
|---|---|---|---|
| 9,392,743 B2 * | 7/2016 | Camacho-Cook ... | A01B 69/008 |
| 10,091,932 B2 * | 10/2018 | Neitemeier ........ | A01D 41/1271 |
| 2003/0226343 A1 * | 12/2003 | van den Berg ...... | A01D 34/008 |
| | | | 56/16.4 R |
| 2015/0319911 A1 | 11/2015 | Wilson et al. | |

OTHER PUBLICATIONS

Giulio Reina et al., "Toward Autonomous Agriculture: Automatic Ground Detection Using Trinocular Stereovision", Sensors, Bd. 12, Nr. 12, Sep. 12, 2012; pp. 12405-12423; XP055401661, DOI:10.3390/s120912405.

Jian Li et al., "Scene Segmentation for Behaviour Correlation", Oct. 12, 2008; Computer Vision, 10th European Conference on Computer Vision, ECCV 2008; Oct. 12-18, 2008; Marseille, France; [Lecture Notes in Computer Science], Springer-Verlag, Berlin, Germany, pp. 383-395, XP019109330.

P. Christiansen et al., "Advanced sensor platform for human detection and protection in autonomous farming", In: "Precision Agriculture '15", Jun. 22, 2015, Wageningen Academic Publishers, XP009500695, pp. 291-297, DOI: https://doi.org/10.3920/978-90-8686-814-8_35.

* cited by examiner

AGRICULTURAL WORK MACHINE FOR AVOIDING ANOMALIES

CROSS REFERENCE TO RELATED APPLICATION

This application claims priority to German Patent Application No. DE 102016118227.3, filed Sep. 27, 2016, the entire disclosure of which is hereby incorporated herein by reference.

TECHNICAL FIELD

This application relates generally to agricultural work machines, and specifically relates to an agricultural work machine configured to sense and avoid obstacles encountered.

BACKGROUND

Agricultural work machines may encounter obstacles, such as tires in the field, which may cause damage to the agricultural work machine. Other irregularities in the field, such as weeds, which can lead to a reduction in the quality of the harvested crop. Manually steering the agricultural work machine, for example during harvesting, thus requires the constant attention of the vehicle operator.

Automatic guidance, such as through use a GPS receiver or topographic maps, reduces the effort of steering the agricultural work machine. However, unknown new obstacles or current irregularities in the crop may be overlooked by these systems. Thus, the vehicle operator still needs to pay constant attention. In order to be warned of obstacles and irregularities early enough, local sensors are used, such as directly on the agricultural work machine, which monitor the environment.

EP 2 143 316 A1 discloses a system for early detection of harvest flow problems or foreign bodies in the harvest flow, and for partial automatic control of a self-driving harvesters, or their work elements. For this, the harvest flow is monitored by means of sensors, such as a camera. EP 2 143 316 A1 discloses two image evaluation methods. The first image evaluation method depicts irregularities in the harvest flow by means of motion blur. The second image evaluation method detects a displacement of crop features by means of an image comparison method, comparing successive images in order to detect foreign bodies.

US 2015/0319911 A1 discloses an analogous method to that in EP 2 143 316 A1. In addition, the method can detect landmarks in the environment.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

(FIG. 7b) crop gaps; (FIG. 7c) tracks; (FIG. 7d) weeds; (FIG. 7e) a low obstacle; and (FIG. 7f) a high obstacle.

DETAILED DESCRIPTION OF EMBODIMENTS

Figure 1:
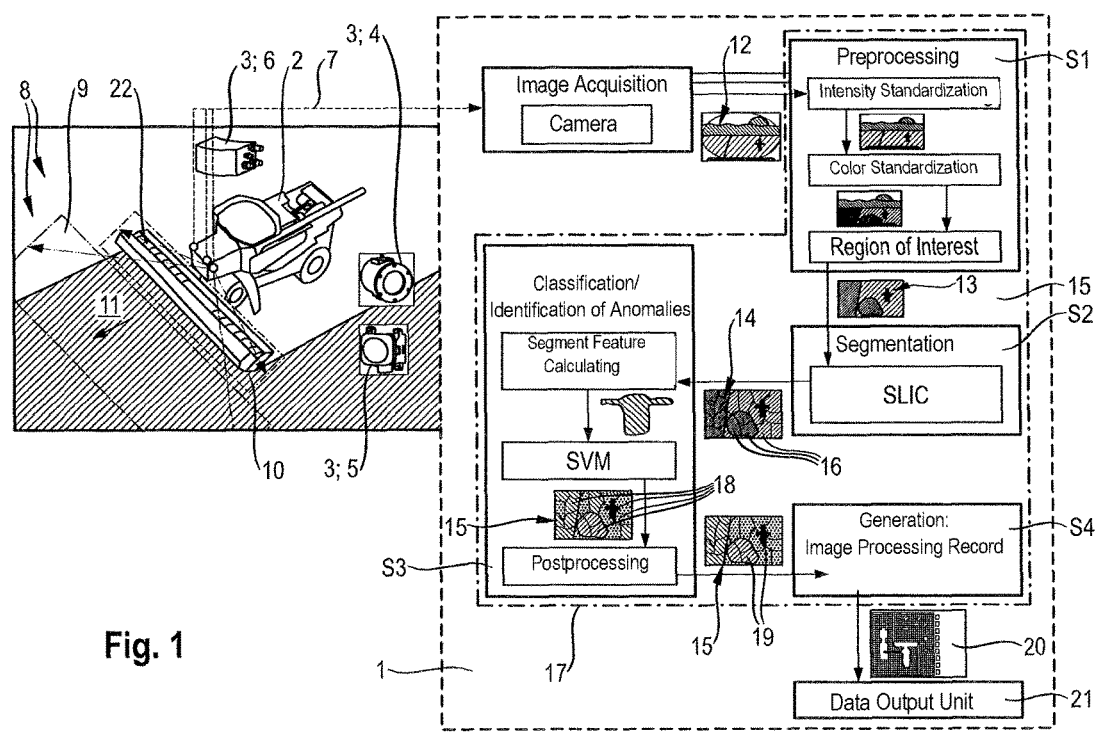
FIG. 1 shows a schematic depiction of the image processing system and an agricultural work machine having the image processing system.

As discussed above, EP 2 143 316 A1 discloses a system for early detection of harvest flow problems or foreign bodies in the harvest flow path, and for partial automatic control of a self-driving harvesters, or their work elements. However, EP 2 143 316 A1 is unable to identify objects or anomalies. US 2015/0319911 A1 discloses an analogous method to that in EP 2 143 316 A1; however, the system in US 2015/0319911 A1 does not detect or identify obstacles.

Thus, some of the systems described in the background only evaluate one defined parameter in order to determine the spreading quality. Such a system is incapable of detecting complex interrelationships between highly diverse parameters that influence the homogeneity of crop spreading.

In one implementation, the agricultural work machine uses an image processing system to detect and potentially avoid anomalies. As discussed in more detail below, an image processing system is disclosed that quickly and reliably detects and identifies anomalies, such as obstacles and/or irregularities in the crop. The image processing system includes: at least a selection of available images, an image analysis unit, and a data output unit, with the image processing system: acquiring a number of images; preprocessing the acquired images in a first step; segmenting the preprocessed images in a further step; classifying the resulting segments in a next step (such that anomalies can be identified); and generating a further processed image data set in a subsequent step. The anomalies may be identified automatically by the image processing system so that a visual identification of anomalies by the vehicle operator may thus be eliminated. In this regard, the vehicle operator is relieved of this task. An alternative manual identification of indications of anomalies for detected unidentified objects is also eliminated. Detected objects are each assigned a datum that is clear to the user as a result of the classification. Furthermore, through the preceding segmentation of the images, the classification and identification are accelerated, making it possible for the method to identify anomalies practically in real-time, and reducing the necessary computing capacity. The preprocessing, on the other hand, increases the reproducibility and thus the reliability of the image processing system. The preprocessing may accelerate the image analysis performed by the image analysis system.

In one implementation, the images are generated by at least one optical sensor, in particular at least one camera, wherein the at least one camera can be a monochrome camera, an infrared camera and/or a color camera. As a result, current images are constantly available to the image processing system. In particular, data regarding the intensity and/or a color are available. In addition, if numerous sensors are used, a larger region of the environment is covered.

In another implementation, the at least one optical sensor comprises at least one laser scanner and/or at least one radar sensor. Image data generated by camera images, for example, are enhanced through the use of these optical sensors. As a result, distance measurements based on signal propagation delays and/or image data regarding shaded/concealed anomalies, for example, are available.

Because the image processing system can digitally process the selection of available images in a simple manner, in one implementation, each image is composed of pixels, with each pixel having an intensity. In particular, each pixel may comprise a monochrome pixel or a color pixel, wherein identical color pixels of the image are each assigned to a color channel of the image, and/or monochrome pixels of the image are assigned to a grey channel of the image, and colors can be developed from the intensities of different color pixels, wherein each color can be converted to a gray scale value.

In order to obtain reproducible results, which may be dependent on environmental conditions such as shadows of trees, for example, a time of day, weather conditions and/or the seasons, a standardization of the acquired images is performed using the first step of preprocessing the acquired images. In particular, the image processing system may perform an intensity standardization and/or a color standardization, and/or a selection of the evaluation range in the acquired images in order to standardize the images. Furthermore, the first step of preprocessing may assist in subsequent segmentation.

In one design, the image processing system determines a pixel-specific intensity correction factor during the intensity standardization for each pixel by means of at least one reference image, and corrects the intensity of each pixel of the acquired images with the respective pixel-specific intensity correction factor. As a result, intensity errors caused by lens distortions in the camera may be corrected in a simple manner. Errors may be cause by a variety of things, such as with wide angle lenses, or such as by reflections on highly reflective surfaces (e.g., painted surfaces on an agricultural work machine).

In another design, the image processing system determines an intensity correction value for each color channel of the acquired images during the color standardization, and corrects the intensities of the pixels of each color channel in a uniform manner by the respective intensity correction value. Each intensity correction value may be determined by means of determining a difference between the measured respective intensities of the color pixels assigned to the respective color channel of a reference object having a known color in the acquired images and the known respective intensities of the color pixels of a reference object having a known color in the acquired images assigned to the respective color channel. Further, the measured respective intensities may be determined, for example, from a selection of color pixels of the reference object having a known color and through the averaging thereof. As a result, the color accuracy may be improved, and in particular color corruptions caused by different lighting conditions and/or camera settings may be prevented. The improvements thus facilitate more efficient, accurate, consistent, and precise image analysis.

In still another design, the selection of the evaluation range of the acquired images comprises an excerpt, a culling, and/or an reduction of the acquired images in each case, wherein the evaluation range extends in particular to a distance of less than 20 meters from the optical sensor (or more specifically, to a distance of six meters from the optical sensor). With this limitation to the image excerpt, culling, or reduction that is to be evaluated, an image data quantity that is to be processed by the image processing system is reduced, while the anomalies can be detected and identified in a timely fashion. Thus, in one implementation, at least a part of an image may be removed from processing based on distance. In one example, the image processing system may remove a part of an image which is further away that a predetermined amount (e.g., more than six meters from the optical sensor or more than 20 meters from the optical sensor). In another example, the image processing system may determine that the entirety of an image is further away than the predetermined amount, and therefore exclude the image entirely from processing. In this regard, the image processing may be improved and in certain instances, may be accelerated.

In one implementation, the image processing system reliably detects an object and the edges of the object by the image processing system segmenting the preprocessed images in the further step into segments with pixels having identical and/or similar colors and/or intensities. This step may be performed by using a superpixel method, and more specifically, a SEEDS superpixel method. The SEEDS superpixel method forms uniform segments with a high edge precision of the object in the image. Furthermore, the SEEDS superpixel method is a quick segmentation method.

The image processing system may classify the segments in the next step, such that at least one segment feature is first calculated in each case from each segment. The segment features are mathematical assignment criteria for each segment, with which classifications can be assigned in a quick and simple manner during the classification of the segments. At least one segment feature may be calculated from the respective intensities of the pixels of the respective segments, and/or from the gray scale values of the pixels in the respective segments. As a result, the data for each pixel of a segment having the segment feature is consolidated in a single value for the entire segment. As a result, subsequent calculations are simplified and accelerated.

In one design, the segment features comprise one, any combination, or all of the following: a lowest intensity of the respective segment; a highest intensity of the respective segment; a difference between the highest and the lowest intensities of the respective segment; a histogram of the respective segment; a horizontal intensity gradient of the respective segment; a vertical intensity gradient of the respective segment; a histogram of the vertical and/or horizontal intensity gradients of the respective segment; and at least one mean intensity of the respective segment (e.g., an arithmetic mean intensity and/or a median intensity of the respective segment). As a result, the image processing system may conduct a classification in a simple and precise manner.

In still another design, image processing system calculates a selection of segment features from a gray scale matrix of the respective segment, such as any one, any combination, or all of the following: a homogeneity; an energy; a correlation and a contrast of the gray scale matrix. The gray scale matrix may include a frequency of a pairing of the intensity ranges and/or the gray scale ranges of two adjacent pixels of the respective segment. As a result, the image processing system may conduct a classification in another simple and precise manner.

In still another design, the segment features comprise a vertical position in the segmented image and/or a geometric center of gravity of the segment. As a result, another datum of the image, such as the positions of the pixels with respect to the segment and/or to the overall image, is used for calculating the segment feature.

In yet another design, the image processing system may quickly and reliably classify the segments, such as the objects detected therewith. In particular, in the next step, the image processing system classifies each segment by means of the at least one calculated segment feature into a classification by means of a support vector machine (SVM), wherein the support vector machine is a mathematical method for classifying segments, and classified images are generated with classified segments, and the anomalies can be identified, in particular, automatically.

The image processing system may determine a classification rating of the segment features for the respective classifications in advance, and use the classification rating for the selection of the most suitable segment features for the support vector machine. Moreover, the support vector machine may use the segment features having a high classification rating, such as having the highest classification rating, for classifying the segments. In addition, the probabilities, in particular of a correct classification, are calculated for each segment feature and/or segment. As a result, the reliability of the classification is increased.

In order to avoid erroneous classification and increase the reliability of the image analysis system, the image processing system may post-process the classifications in the next step, after classifying the segments, wherein the image analysis system deletes erroneous classifications and/or classifications having low calculated probabilities. Further, the image processing system compares numerous directly successive classified images having classified segments in order to identify erroneous classifications, and classifications of segments that are only present in a single classified image are evaluated as erroneous.

In one design, each classification is assigned at least one segment feature. In this manner, each classification can be assigned to a segment in a simple manner.

The image processing system may generate a further processable image data set in the following step from the classified images with the classified segments by means of warping, stitching and/or transference into an occupancy grid. As a result, the image processing system can consolidate image data sets from numerous sensors in a simple manner. In addition, distances between anomalies and/or to the agricultural work machine can be displayed in a clear manner.

The further processable image data set may be consolidated with data sets from other sensors (e.g., optical sensors), and further processed to form another further processable image data set. As a result, numerous optical sensors can be used in order to increase the degree of coverage of the environment. Moreover, classifications can be improved, because new segment features are made available to the image processing system through other types of optical sensors, e.g., radar sensors and/or laser scanners. In particular, radar beams can penetrate a crop and detect concealed anomalies, such as obstacles. The laser scanners, on the other hand, can determine precise distances to anomalies, in particular even small anomalies.

The data output unit may be configured to make at least one of the further processable image data sets available to other systems of an agricultural work machine, such as a regulating and control unit. The at least one further processable image data set can be used in a variety of ways. For example, the at least one further processable image data may be used to control the agricultural work machine and/or its work organs. As a result, measures (such as changes in control of one or both of the agricultural work machine or its work organs) can be taken in order to: avoid identified anomalies (e.g., obstacles); to drive in tracks; and/or to stop the agricultural work machine.

In one design, the further processable image data set can be used by the agricultural work machine for environment recognition. As one example, the further processable image data set may be used for the automatic identification of anomalies in front of the agricultural work machine. As a result, the environment of the agricultural work machine (e.g., the region in front of the agricultural work machine) can be monitored in a simple manner. One or both of a warning and/or correction actions may thus be taken. For example, a warning may be issued early enough for the operator to take corrective action to avoid obstacles and/or irregularities in the crop. Alternatively or in addition, the system may implement corrective measures for controlling the agricultural work machine and/or its work organs. The vehicle operator is thus relieved of this task. In particular, the image processing system may be used for the autonomous and/or partially autonomous control of the agricultural work machine.

In another design, the anomalies comprise obstacles and/or irregularities in the crop, and are assigned to classifications. Irregularities may comprise cut grain, crop gaps, tracks, weeds and/or crop edges, and obstacles may comprise low and/or high obstacles, wherein low obstacles can be bypassed by raising an attachment without damaging the agricultural work machine, and high obstacles necessitate that the agricultural work machine be steered around them. As a result, risks, in particular to the agricultural work machine and a harvesting process may be automatically detected. The vehicle operator is thus relieved of this task. In addition, the anomalies may be grouped in a classification on the basis of their importance for the vehicle operator, and depicted collectively as a classification. In particular, the image processing system may generate a graphical user interface whereby different classifications are consolidated into a visual display with the same colors. In this way, the work of the vehicle operator is reduced. In particular, the operator no longer needs to decide whether or not there is an obstacle, because the obstacle may be detected immediately.

Turning to the figures, FIG. 1 shows a schematic depiction of the image processing system 1, with its individual steps S1-S4, and an agricultural work machine 2, having the image processing system. The agricultural work machine 2 may comprise combine harvesters, field choppers and/or tractors. An example agricultural work machine is U.S. patent application Ser. No. 15/633,220, incorporated by reference herein in its entirety. One or more attachments 22 can be disposed on the agricultural work machine 2. The agricultural work machine 2 is designed here as a combine harvester having a cutting unit as the attachment 22. Optical sensors 3 are disposed on the agricultural work machine 2, in particular at least one camera 4, which is designed as a color and/or monochrome camera. Moreover, at least one radar sensor 5 and/or at least one laser scanner 6 may be positioned in or disposed on the agricultural work machine 2. The use of other optical sensors, such as at least one infrared camera, or an arbitrary number of optical sensors 3 are contemplated. The optical sensors 3 generate images 7 of an environment 8 of the agricultural work machine 2. As discussed above, the optical sensors 3, such as the at least one camera 4, may comprise color cameras and/or monochrome cameras, The environment 8 comprises an area 9 in front of the agricultural work machine and/or a region 10 of the attachment. The front area 9 extends in front of the agricultural work machine 2 in the direction of travel 11, such as at least over a width corresponding to a width of the attachment 22. Alternatively or in addition, the generation of images 7 of other regions in the environment 8 is contemplated. Thus, by way of example, images 7 of regions lying behind the attachment and/or regions adjacent to and/or behind the agricultural work machine 2 may also be generated. It is likewise contemplated that images 7 are generated of attachments 22, work organs, or regions inside the agricultural work machine 2.

The steps of the method for operating the image processing system 1 are explained below in greater detail. The image processing system 1 has an image analysis unit 17 for carrying out this method for image processing, comprising steps S1, S2, S3, S4. Any combination, or all of steps S1, S2, S3, S4 are contemplated. The image analysis unit 17 may be designed as a computer. In this regard, the image analysis unit 17 may take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. In particular, the image analysis unit 17 may comprise logic, such as computable executable instructions, which enable the use of the image analysis techniques and/or the corrective measures (e.g., warnings or automatic changes in operation) disclosed herein. The image analysis unit 17 can be configured with hardware and/or firmware to perform the various functions described below and shown in the flow diagrams. Also, some of the components shown as being internal to the image analysis unit 17 can also be stored external to the image analysis unit 17, and other components can be used. As such, the image analysis unit 17 may comprise processor(s) in communication with one or more memories, with image data and/or the data structures used in the image analysis unit 17 analytics, discussed further below.

A number of images 7 from the optical sensors 3 may be acquired by the image processing system 1. For example, the images 7 may be obtained from one or more cameras 4, such as a color camera. In a first step S1, the acquired images 12 are preprocessed. The acquired images 12, such as their respective image properties, are standardized thereby, and an excerpt may be selected from each acquired image 12. In a further step S2, the preprocessed images 13 are segmented into segments 16. In a subsequent step S3, the segments 16 of the segmented images 14 are classified, in that they are assigned previously created classifications 18. As a result, classified images 15 having identifiable anomalies 19 are created. The image analysis unit 17 may automatically identify the anomalies 19 in the classified images 15. In particular, the image processing system 1 may identify the anomalies 19 during the classification in step S3. Alternatively, the identification of the anomalies 19 may occur elsewhere, e.g., in a regulating and control unit of the agricultural work machine 2. In this regard, the identified anomalies 19 may be input to the image processing system 1. In a subsequent step S4, the image processing system 1 generates a further processable image data set 20. The image analysis unit 17 exports the further processable image data set 20 to a data output unit 21. The data output unit 21 may comprise a device visually depicts the further processable image data set 20 and/or exports it to another system of the agricultural work machine 2.

FIGS. 2 to 5 show the individual steps S1-S4 of the image processing system 1 with images 7 and/or schematic illustrations of the individual steps S1-S4.

The images 7 may comprise digital images. The number of images 7 may be a portion of a series of images or a video, such as one or more frames in a video. The images 7 are generated by means of an image sensor. For example, the images 7 may be generated by means of a Bayer sensor having a Bayer pixel pattern (see FIG. 2). The images 7 are composed of pixels 31. In this regards, the image sensor may generate the pixels 31 associated with the images 7. Each pixel 31 has an intensity 35. The image sensor detects intensities 35 of each pixel 31. The intensities 35 may be a measure for the light energy per area of the image sensor, and per time unit. Moreover, each pixel 31 may be a monochrome pixel or a color pixel. Depending on the type of image sensor, with color pixels, color filters are applied to the surface of each pixel 31 of the image sensor. The image sensors of color cameras, such as the Bayer sensor, may have different types of color pixels, wherein each type has a different color filter. Identical color pixels of the image 7 may be each assigned to one color channel of the image 7. Thereby, a number and a distribution of the color channels is substantially dependent on the type of image sensor. By way of example, the color pixels and color channels in a Bayer image sensor are divided into red, green and blue color pixels and color channels. Colors can be obtained from the intensities of the different color pixels, wherein each color can be converted to a gray scale value. In order to calculate the gray scale value, the intensities 35 of the individual color channels may be corrected such that they correspond to the expectations of human sight. Subsequently, the intensities 35 of adjacent color pixels corrected in this manner may be combined to form a gray scale value.

The monochrome pixels of the image 7 may be assigned to a gray channel of the image 7. Monochrome pixels may not have a color filter. Although a color filter may be applied to them, this filter is then substantially uniform for all of the monochrome pixels, however, and only filters out light from a light spectrum that is not visible. The image sensors of monochrome cameras may have monochrome pixels. In addition, some image sensors in color cameras also may have image sensors with monochrome pixels and color pixels.

The use of other types of image sensors for color cameras, which have a construction differing from that of Bayer sensors, is contemplated. It is thus contemplated to use image sensors having a different pixel pattern, e.g., an XTrans image sensor, or an image sensor having a different construction principle, e.g., a Foveon image sensor. In the case of the Foveon image sensor, each pixel 31 comprises numerous color channels. The pixels 31 are substantially uniform thereby, and do not have a color filter.

Figure 2:
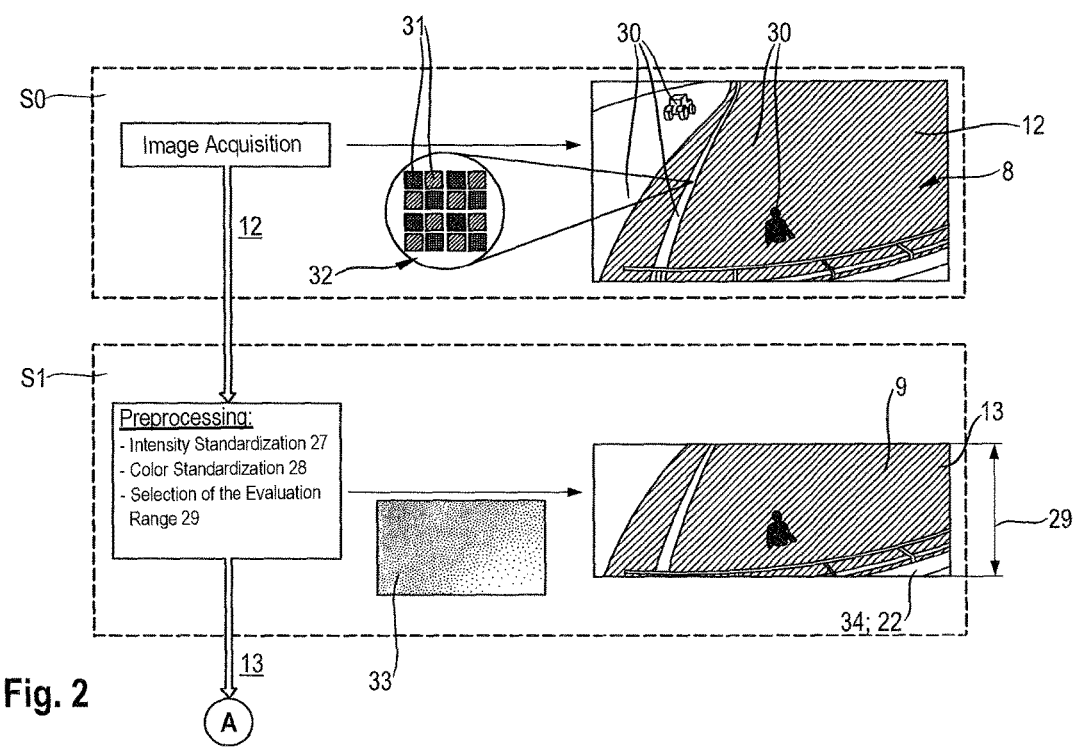
FIG. 2 shows a schematic depiction of the image acquisition and a first step of the image processing system.

FIG. 2 shows an acquired image 12, which has been acquired from a number of images 7 of the environment 8 of the agricultural work machine 2. The acquired images 12 comprise unidentified objects 30, which may be portions of the acquired images 12 that can be visually distinguished from one another, in particular by means of edges.

The acquired images 12 are preprocessed in a first step S1 of the image processing system 1. At least one standardization of the acquired images 12 may be performed. In particular, the image processing system 1 may perform an intensity standardization 27 and/or a color standardization 28. In addition, the image processing system 1 may perform a selection of an evaluation range 29 in the acquired images 12.

The intensity standardization 27 can be carried out with at least one color or gray channel. At least one reference image 33 may be created here for the intensity standardization 27, which depicts, for example, intensity curves specific to the lens or specific to the environment. Numerous reference images 33 may be generated for this, and superimposed on one another to form a reference image 33. The maximum intensity 35 of a pixel 31 of the reference image 33 may be used together with intensity curves in the reference image 33 in order to calculate a pixel-specific intensity correction factor for each pixel 31. Subsequently, each pixel 31 of the acquired images 12 is corrected with the pixel-specific intensity correction factor, such as by multiplication.

In one implementation of the subsequent color standardization 28, a reference object 24 with a known color may be selected in the acquired images 12, such as in a number of acquired images 12. The reference object 34 may be a painted component and/or a painted attachment 22 of the agricultural work machine 2, the exact color of which is known. In the present example, the reference object 34 is a reel. An intensity correction value is determined in each case for each color channel of the acquired images 12, and the intensities 35 of the pixels 31 of each color channel are uniformly corrected by the respective intensity correction value. The correction may occur through subtraction or addition of the intensity correction value. Each intensity correction value may be determined by determining the difference between the measured respective intensities 35 of the color pixels of a reference object 34 having a known color in the acquired image 12 assigned to the respective color channel and the known respective intensities 35 of the color pixels of a reference object 34 having a known color in the acquired image 12 assigned to the respective color channel. The measured respective intensities 35 are determined thereby, in particular from a selection of color pixels of the reference object 34 having a known color and through the averaging thereof. The mean value may be a median thereby.

Further standardizations, e.g., a correction of lens distortions or a signal adjustment of different types of image sensors, are contemplated.

In the preprocessing of the first step S1, the image processing system 1 may also select an evaluation range 29 of the acquired images 12. The selected evaluation range 29 comprises in each case an excerpt of the acquired images 12, such as the front area 9. A length of the evaluation range 29 may extend in the direction of travel 11 up to a distance of less than 20 meters from the optical sensor 3. The length of the evaluation range 29 may extends in the direction of travel 11 up to a distance of six meters from the optical sensor 3. In this regard, the evaluation range may be a predetermined amount. The evaluation range 29 may also extend over at least a width of the attachment 22 of the agricultural work machine 2. In one implementation, the possible length and width of the evaluation range 29 are substantially dependent on the computing power of the image analysis unit 17 and a vehicle speed of the agricultural work machine 2. A selection of the evaluation range 29 is optional, assuming that the capacity of the image analysis unit 17 is sufficient.

Figure 3:
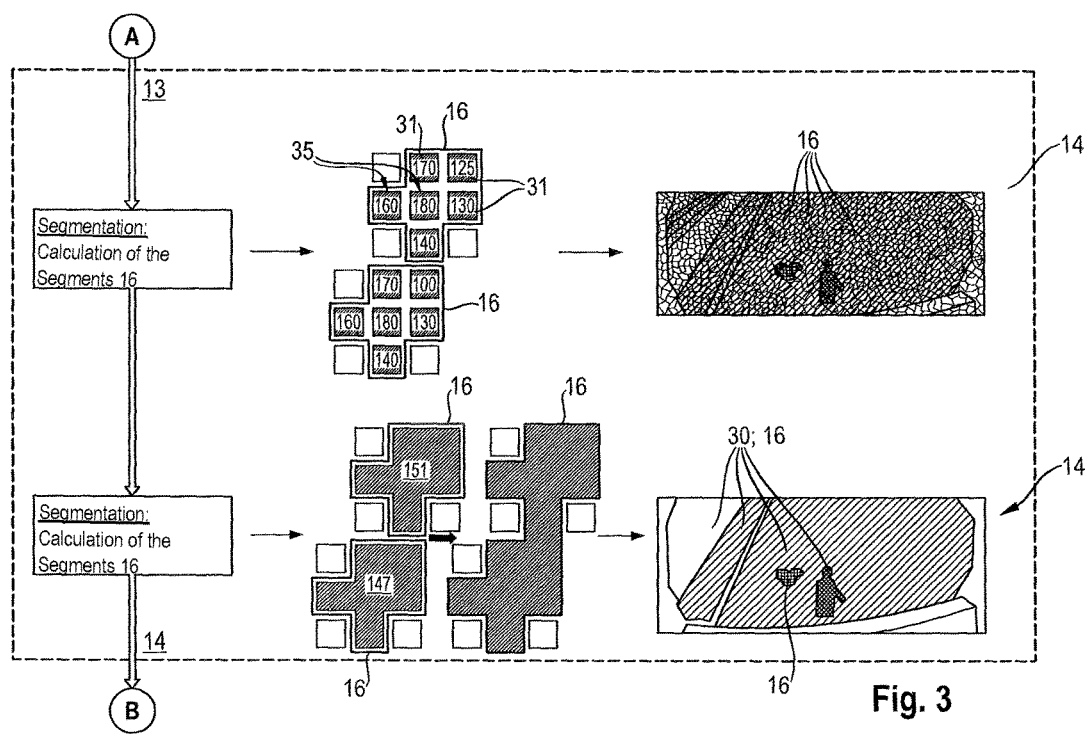
FIG. 3 shows a schematic depiction of a further step of the image processing system.

FIG. 3 shows a schematic depiction of a further step S2 of the image processing system 1. In the further step S2, the preprocessed images 13 are segmented into segments 16 having pixels 31 of the same and/or similar color and/or intensity 35. For this, a mathematical segmentation method may be used, such as a SEEDS superpixel method. After application of the segmentation method, segmented images 14 are obtained. Edges of the objects 30 may then be imaged from portions of the edges of the segments 16. Adjacent pixels 31 having the same and/or similar color and/or intensity 35 may be consolidated in the segments 16. The segments 16 may correspond to super-pixels. The SEEDS superpixel method is a superpixel method. The superpixel methods belong to groups of region-based methods of the segmentation method. With the superpixel methods, super-pixels grow, starting from an initial seed point, in that pixels 31 having the same and/or similar color and/or intensity are consolidated to form a superpixel. If edges of superpixels abut one another, a new seed point for these superpixels is selected in each case, corresponding to a new geometric center of gravity of the respective superpixel, and these superpixels grow again, starting from the respective new seed point. Homogenous superpixels are obtained, which reliably reproduce the edges of the object 30. With the SEEDS superpixel method, on the other hand, the complete, renewed growing of the superpixels is avoided, and only the edges of the superpixel are displaced. As a result, the method is quicker than the previous superpixel methods or segmentation methods, while still exhibiting the same high precision. In this regard, the improvements facilitate more efficient, accurate, consistent, and precise identification of obstacles. Thus, these features (among others described here) are specific improvements in way that the underlying computer system (such as the image processing system) operates. The use of other superpixel methods is contemplated. For example, an SLIC superpixel method is contemplated. Alternatively to the superpixel/segmentation methods, other region-based methods, such as a region growing method, can also be used for segmentation. Moreover, instead of a region based method, threshold value segmentation methods, edge-based segmentation methods, or hybrid segmentation methods can also be used. It is also contemplated to form segments 16 on the basis of features other than the intensity 35 and/or the color.

In the further step, the segments 16 are also optionally consolidated to form larger segments 16, and the redundancy of the segments 16 in the segmented images 14 is thus reduced. For this, the intensities 35, the colors and/or the gray scale values of the pixels 31 of each segment 16 of the segmented images 14 are each consolidated, such that each segment 16 has uniform intensities, a uniform color and/or a uniform gray scale value. Adjacent segments 16 having the same and/or similar intensities 35, colors and/or gray scale values are then consolidated to form larger segments 16. As a result, each object 30 in the segmented images 14 may be encompassed by a segment 16 in each case. Edges of the segments 16 may then correspond to the edges of the object 30. Not consolidating the segments 16 is also contemplated, because the segmentation by means of the segmentation method is already sufficient for carrying out the next step.

Figure 4:
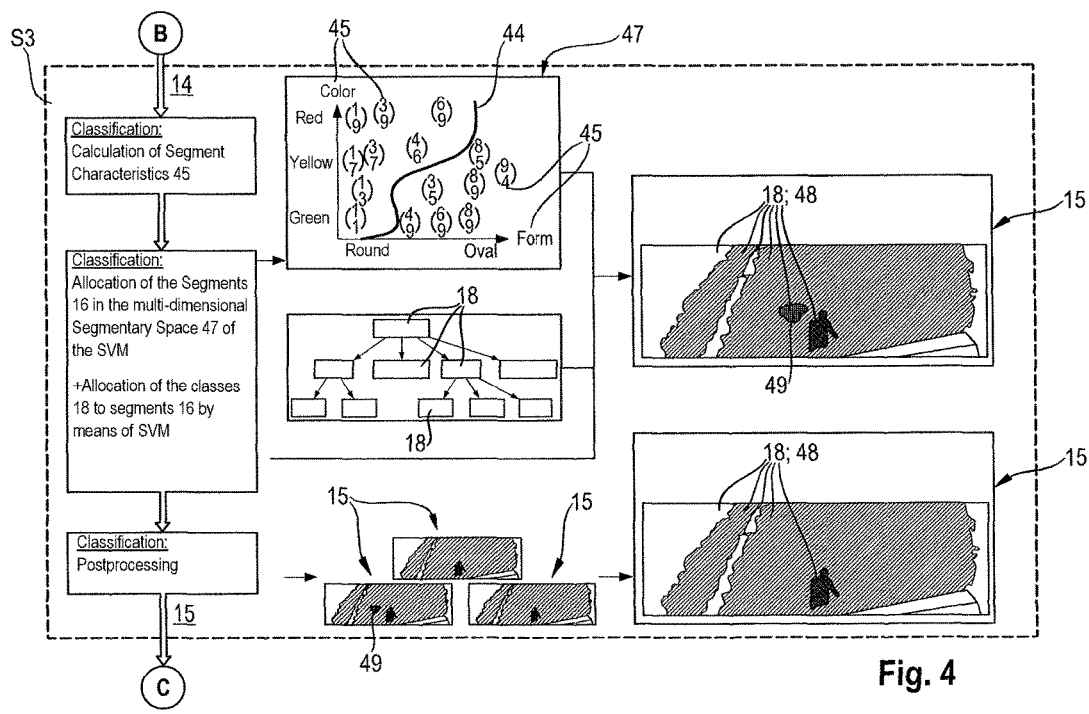
FIG. 4 shows a schematic depiction of a next step of the image processing system.

FIG. 4 shows a schematic depiction of a next step S3 of the image processing system 1. The segments 16 are classified in the next step S3. For this, at least one segment feature 45 is calculated from each segment 16. The segment features 45 are calculated for this from the respective intensities 35 of the pixels 31 of the respective segment 16, and/or from the gray scale values of the pixels 31 of the respective segment 16.

The segment features 45 may comprise a lowest intensity 35 of the respective segment 16, a highest intensity 35 of the respective segment 16, a difference between the highest and lowest intensities 35 of the respective segment 16, a histogram of the respective segment 16, a horizontal intensity gradient of the respective segment 16, a vertical intensity gradient of the respective segment 16, a histogram of the vertical and/or horizontal intensity gradients of the respective segment 16, in particular an arithmetical intensity mean value and/or an intensity median of the respective segment 16. Other mean values of the segment feature 45 are likewise contemplated, such as a geometric, harmonic quadratic and/or cubic mean value, and/or weighted mean values.

Moreover, the segment features 45 may comprise a selection of segment features 45, which are calculated from a gray scale matrix of the respective segment 16, wherein the gray scale matrix includes a frequency of a pairing of the intensity ranges and/or gray scale ranges of two adjacent pixels 31 of the respective segment 16. Each intensity range and/or gray scale range represents a range between two intensities 35 and/or gray scale values. Each intensity range and/or gray scale range is also the same size, and covers, together with the other intensity ranges and/or gray scale ranges, a value range between the lowest and highest intensities 35 and/or the gray scale value in a segment 16. In particular, the segment features 45 comprise a homogeneity, an energy, a correlation and/or a contrast in the gray scale matrix. The homogeneity is a measure thereby for a similarity in the intensity ranges and/or the gray scale ranges of the adjacent pixels 31. The energy is a measure for a numerical concentration of specific pairings of two intensity ranges and/or gray scale ranges in a segment 16. The correlation is a measure for a frequency of a statistical correlation of specific pairings of intensity ranges and/or gray scale ranges by means of the determination of variances. A small variance relates to a statistical correlation thereby. The contrast is a measure for a frequency of strongly differing pairings of the intensity ranges and/or gray scale ranges in a segment 16.

Moreover, the segment features 45 may comprise a vertical position in the segmented image 14 and/or a geometric center of gravity of the segment 16. The vertical position in the segmented image 14 relates here to pixel coordinates of the segment 16 in the two-dimensional segmented image 14. The geometric center of gravity of the segment 16 is based on a physical center of mass. Further segment features 45 are also contemplated.

In the next step S3, each segment 16 is classified in a classification 18 by means of the at least one calculated segment feature 45, by means of a support vector machine, wherein the support vector machine is a mathematical method for classifying segments 16. Classified images 15 are generated thereby with classified segments 48. The support vector machine is an adaptive mathematical process, in particular a mathematical model for the automatic classification of segments 16 and formation of classification limits 44. The classification limits 44 formed thereby have the greatest possible spacings to all other segments 16. In one implementation, a support vector machine having "one against all" encoding is used. With the one against all encoding, a segment 16 is assigned to numerous possible classifications 18 having different probabilities for a correct assignment. The most probable classification 18, however, is output. Thus, with a potential later consolidation with other further processable image data sets 20, in particular from other optical sensors 3, it is possible to compute the probability of the classification assignments of numerous further processable image data sets 20 to one another. Other algorithms for the support vector machine, e.g., a Gaussian function, are contemplated for use with the image processing system 1.

The support vector machine assigns each segment 16 based on the at least one calculated segment feature 45, such as in a distinct manner, to a classification 18. For this, it classifies the segments 16 into sub-ranges of a multi-dimensional segment feature space 47. Different segment features 45 can be combined thereby. Thus, classified images 15 having classified segments 48 are formed from the segmented images 14.

The support vector machine may be trained prior to use. In the training of the support vector machine, the segments 16 of the segmented images 14 are manually assigned to classifications 18 in advance, such as in a one-time operation at the production facility. Optionally, a subsequent training of the support vector machine is also possible, such as during a harvesting as well. The objects 30 may be assigned classifications 18 thereby in a simple haptic/visual manner, e.g., by means of a touchscreen.

Moreover, a classification rating of the segment features 45 for the respective classifications may be determined in advance, and used to select the best segment feature 45 for the support vector machine. The classification rating is a measure for the suitability of a segment feature 45 for a distinct classification assignment. If the classification rating of a segment feature 45 is too low for a specific classification 18, this segment feature 45 may not be used for assigning this classification 18. As a result, the necessary computing effort is also reduced. The classification rating may be checked by means of statistical and/or empirical tests, in particular by means of a cross-validation, a confusion matrix, and/or a receiver operating characteristic curve. Further tests for determining the classification rating are contemplated. The support vector machine may use segment features 45 having a high classification rating, in particular with the highest classification rating, for classifying the segments 16. As a result, the segments 16 may be distinctly and reliably classified.

Moreover, the probabilities, in particular a posteriori probabilities, of a correct classification may be calculated for each segment feature 45 and/or segment 16, and may be defined for each classification.

In the next step S3, the classifications may be post-processed after the classification. Erroneous classifications 49 and/or classifications having low calculated probabilities are deleted thereby. In order to identify erroneous classifications 49, numerous, such as directly successive, classified images 15 having classified segments 48 are compared, and the classifications of segments 16 that only occur in a single classified image 15 are evaluated as erroneous.

Each classification 18 may be assigned at least one segment feature 45. Combinations of segment features 45 may be assigned to the classifications. Thus, a single segment feature 45 and/or a combination of segment features 45 serves in each case for the preferably distinct assignment of the respective classification 18 to each segment 16. Moreover, the image processing system 1 may define values, threshold values and/or value ranges for each segment feature 45 for assignment by means of the support vector machine for each classification 18.

Figure 5:
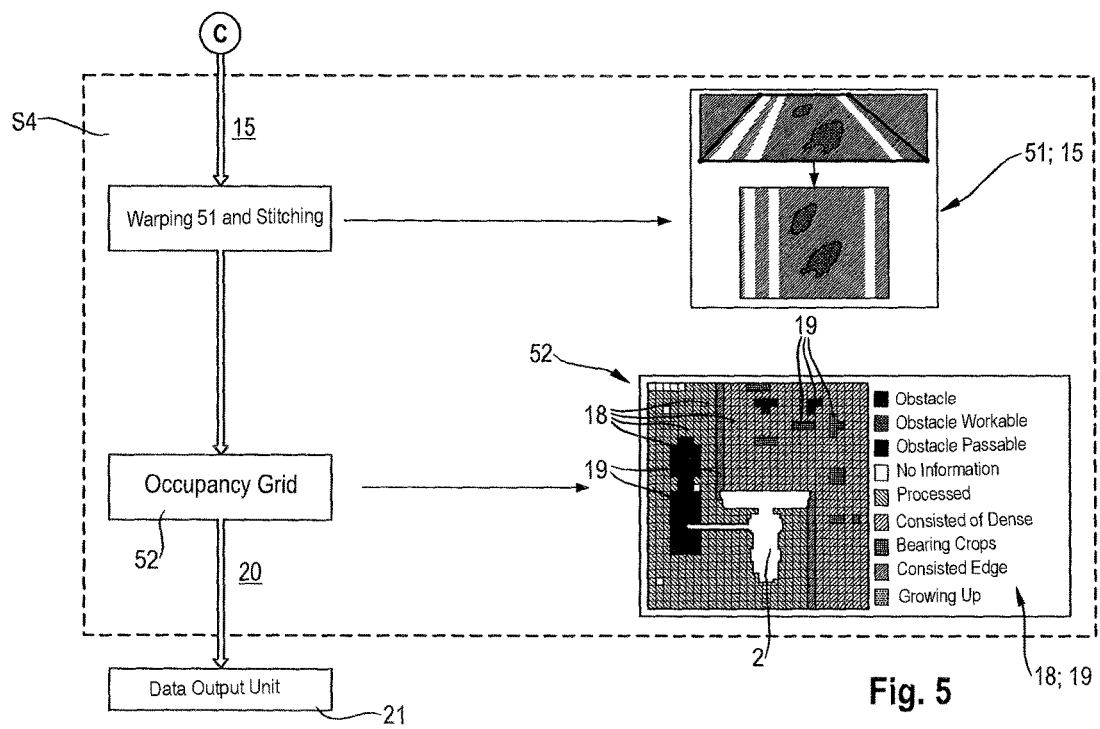
FIG. 5 shows a schematic depiction of a subsequent step of the image processing system.

FIG. 5 shows a schematic depiction of the following step S4 of the image processing system 1. In the following step S4, the image processing system 1 generates a further processable image data set 20, such as from the classified images 15 having the classified segments 48, by means of warping 51, stitching and/or a transfer into an occupancy grid 52. A perspective is transformed with warping 51. In particular, a perspective corresponding to a camera orientation is changed to a bird's eye view. With stitching, images 7, 15, in particular from numerous optical sensors 3, in particular cameras 4, which are spatially and/or temporally linked, are combined to form an image 7, 15 (not shown). This results in a larger image 7, 15, having a greater coverage of the environment 8. It is also contemplated that the stitching be carried out at other points in the method. The transfer into the occupancy grid 52 results in a spatial assignment of classified segments 48 and/or identified anomalies 19. This depiction depicts the spatial distances of the individual classified segments 48 and/or identified anomalies 19 to one another and to the agricultural work machine 2.

The further processable image data set 20 may be consolidated with image data sets of other sensors, such as optical sensors 3, and further processed to form another further processable image data set 20. The image processing system 1 may use the other further processable image data set 20 thereafter, instead of the further processable image data set 20. Thus, the other further processable image data set 20 can be visually displayed and/or exported to other systems of the agricultural work machine 2. Other optical sensors 3 are radar sensors 5 and/or laser scanners 6, in particular.

The data output unit 21 may be configured to provide at least one of the further processable image data sets 20 to other systems of the agricultural work machine 2, in particular a regulating and control unit. The data output unit 21 may be designed as an interface. The data output unit may also be connected to one or more systems of the agricultural work machine 2 via a CAN bus, ISO bus, or other data transfer systems, e.g., Bluetooth or WLAN. The data output unit 21 may be connected to the regulating and control unit 23, and/or to the display unit. Moreover, the at least one further processable image data set 20 may be used to control the agricultural work machine 2 and/or its work organs. As a result, the detected objects 30, in particular the identified anomalies 19, can be used to control the agricultural work machine 2 and/or its work organs. Thus, the agricultural work machine 2 may be configured to avoid and/or stop at an anomaly 19 autonomously. Alternatively or additionally, a visual or acoustic warning and/or control instructions can be displayed to the vehicle operator.

In one implementation, at least one of the further processable image data sets 20 can be used by the agricultural work machine 2 for environment recognition, in particular for identifying anomalies 19 in the front area 9. The anomalies 19 may be simultaneously detected and, in particular, automatically identified with the classification, in that the anomalies 19 have been previously assigned to classifications 18. A portion of, or the entire, environment 8, in particular the front area 9, may be displayed on a display of the agricultural work machine 2. The display may be depicted as a colored image 7 of the camera 4 and/or may be as a schematic view from above, in particular as an occupancy grid 52, wherein the anomalies 19 are likewise colored. The coloring is based on the classifications and/or anomalies 19, such that the classifications 18 and/or the anomalies 19 can be readily distinguished.

Figure 6:
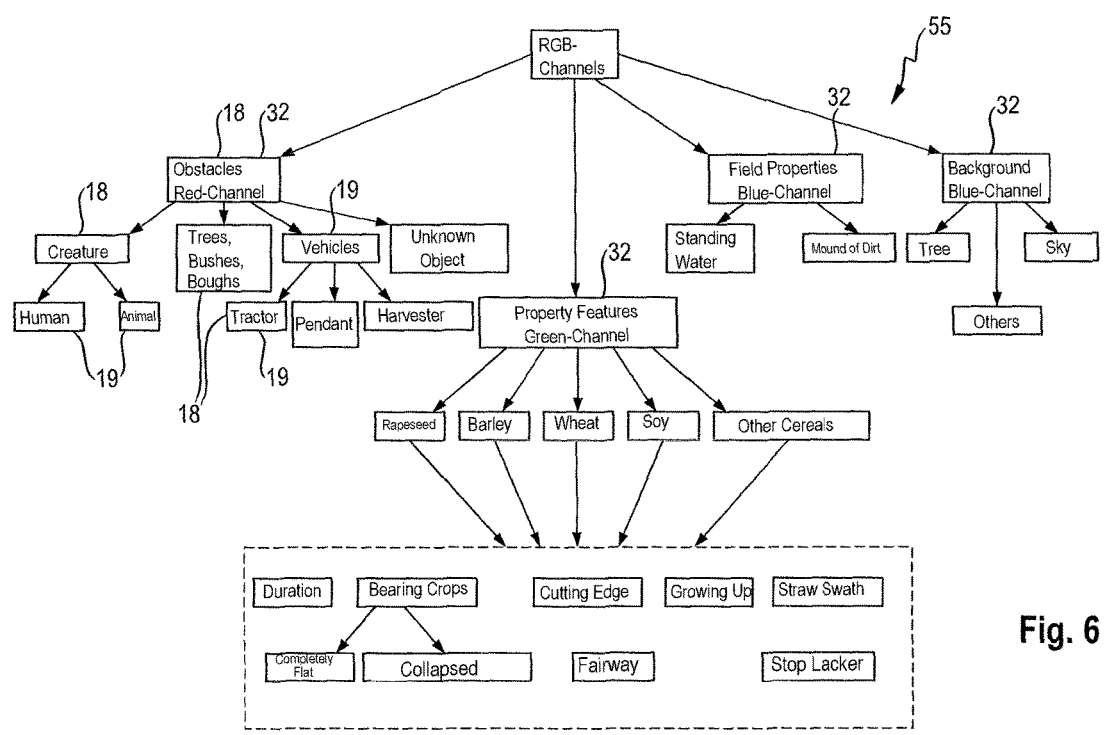
FIG. 6 shows a schematic assignment of classifications.
Figure 7A:
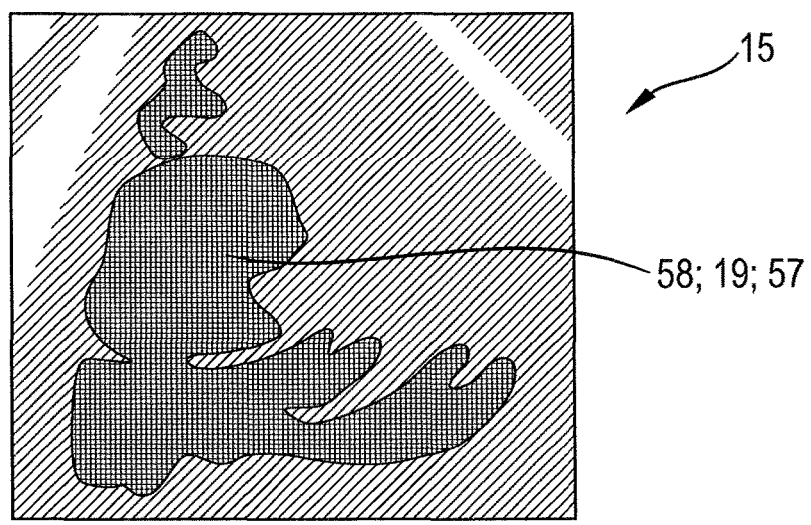
FIGS. 7a-f shows a schematic depiction of applications of the image processing system for the identification of anomalies, such as (FIG. 7a) cut grain.
Figure 7B:
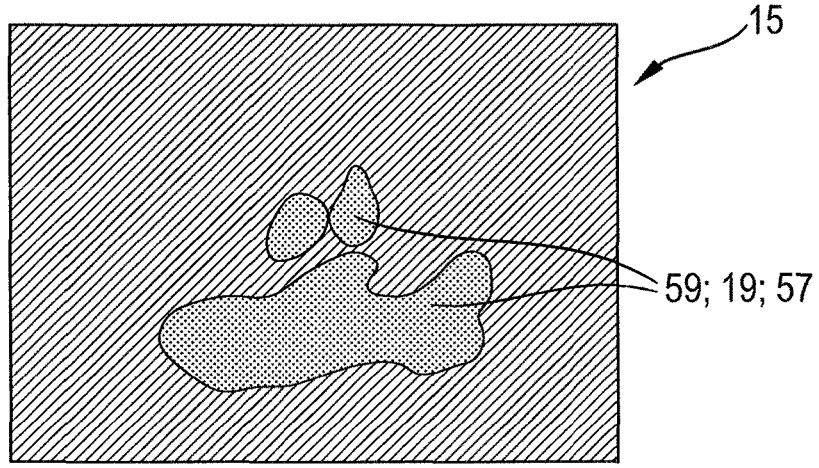
Figure 7C:
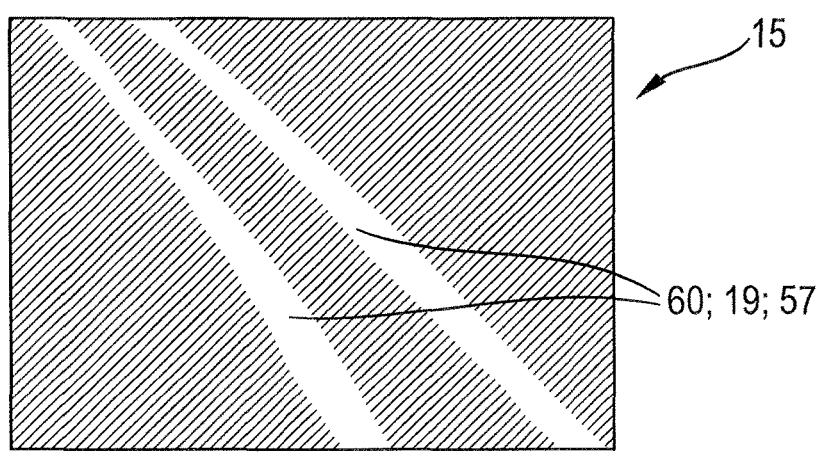
Figure 7D:
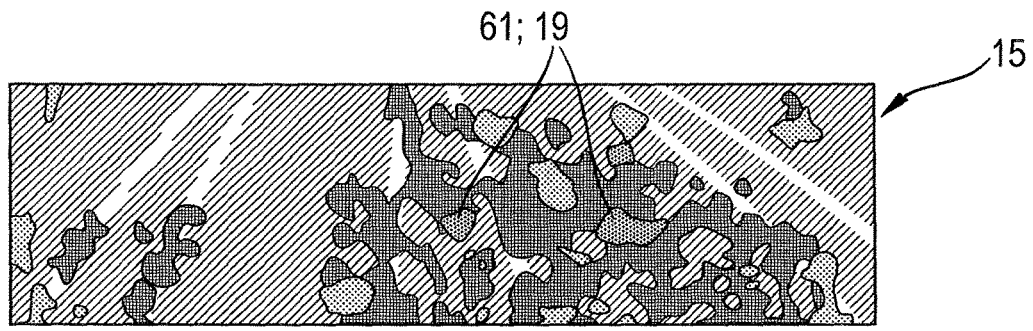
Figure 7E:
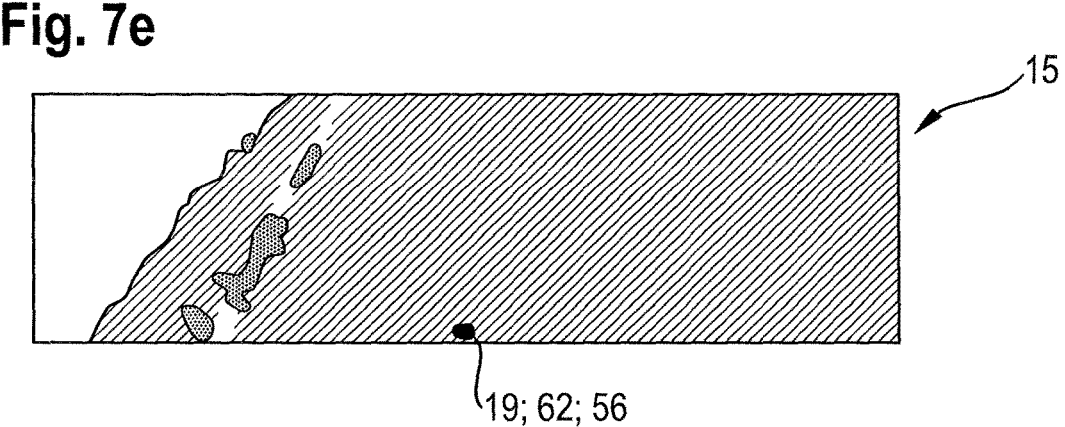
Figure 7F:
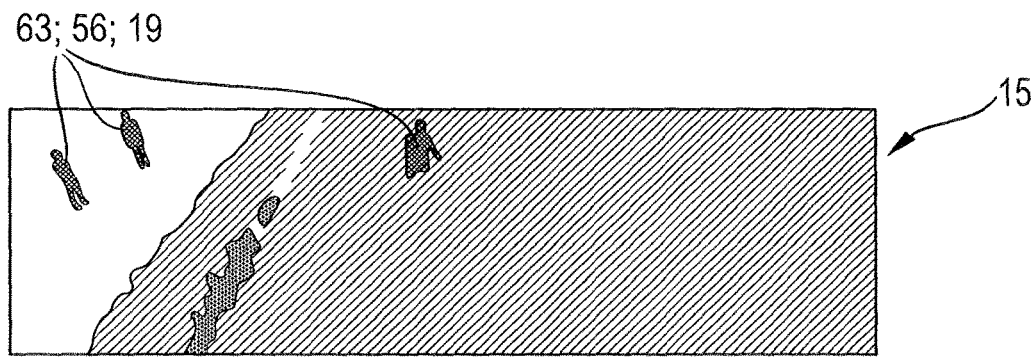

FIG. 6 shows an exemplary schematic assignment of classifications 18. A different assignment of classifications 18 can also be carried out. The classifications 18 may be organized in a classification structure 55. It has numerous structure levels. The classifications may include: sky, different types of grain, e.g., rapeseed and/or wheat, crop densities, various anomalies 19, etc. The classifications 18, the assigned segment features 45 and/or the classification structure 55 may be stored in a database, which is accessed by the image processing system 1, in particular the support vector machine, for the classification. Moreover, the anomalies 19 may be assigned to the classifications 18. In particular, they may be assigned to the classifications 18 based on their shape, size, structure, materials, components, position, brightness, color and/or a necessary control behavior of the agricultural work machine 2 and/or its work organs. A number of classifications 18 and/or anomalies 19 may be expanded.

FIGS. 7a-f show a schematic depiction of applications of the image processing system 1 for identifying exemplary selected anomalies 19. Anomalies 19 may be objects 30 in the environment 8 that have a direct effect on the operation of the agricultural harvester 2. In one design, the anomalies 19 comprise obstacles 56 and/or irregularities in the crop 57. Moreover, they may comprise harvested crop and stubble field.

Irregularities in the crop 57 substantially comprise surface changes in the height and/or orientation of plant stems of the crop. In particular, irregularities in the crop 57 comprise cut grain 58 (FIG. 7a), crop gaps 59 (FIG. 7b), tracks 60 (FIG. 7c), weeds 61 (FIG. 7d), and/or crop edges (not shown).

Obstacles 56 comprise objects 30 in particular, with which the agricultural work machine 2, in particular its attachments 22, could collide, resulting in damage to the agricultural work machine 2, the attachment, and/or its work organs. They also comprise unidentified objects. Unidentified objects are those objects 30 that the support vector machine is unable, i.e. with sufficient probability, to clearly assign to an existing classification. These include, in particular, obstacles 56 for which the support vector machine has not been trained. Obstacles 56 also comprise animals and people that would be injured in a collision, and moreover, would contaminate already harvested crops. Furthermore, obstacles 56 comprise vehicles or devices with which the agricultural work machine 2 interacts in the framework of the harvesting process, e.g., a transport vehicle during the loading thereof with harvest. The obstacles 56 may comprise small, medium sized and/or large obstacles 56. The obstacles 56 may be divided into low obstacles 62 and/or high obstacles 63, wherein low obstacles 62 can be bypassed, in particular, by raising the attachment 22 without causing damage to the agricultural work machine 2, and high obstacles 63 require, in particular, redirection or stopping of the agricultural work machine 2. Low obstacles 62 comprise, e.g., tires, low rocks, piles of dirt, and/or small animals, e.g., rabbits. High obstacles 63 comprise, on the other hand, trees, large boulders, bodies of water, people, larger animals, e.g., deer, other agricultural work machines 2, and/or poles. Other obstacles 56 are likewise contemplated. The support vector machine may previously be trained with appropriate anomalies 19 in order to detect the anomalies 19, in particular at the production facility. The identified anomalies 19 may be displayed to the vehicle operator, in particular in different colors, and/or used for controlling the agricultural work machine 2 and/or its work organs. Thus, the agricultural work machine 2 can be configured to automatically remain in a track 60, avoid an obstacle 56, raise an attachment 22 over an obstacle 56, and/or to stop.

With the preferred color distinguishable display of the anomalies 19, colors are assigned to the anomalies 19, such as depending on their assignment in the classifications. By way of example, all of the high obstacles 63 are depicted in red, and all of the low obstacles 62 are depicted in orange.

The image processing system (1) may be configured to selection of the evaluation range (29) of the acquired images (12) with an excerpt of the acquired images (12) in each case, wherein the evaluation range (29) extends in particular to a distance of less than 20 meters from the optical sensor (3), and furthermore in particular to a distance of six meters from the optical sensor (3).

Further, the image processing system (1), in the further step (S2), is configured to segment the preprocessed images (13) into segments (16) having pixels (31) with the same and/or similar colors and/or intensities, in particular by means of a superpixel method, and furthermore in particular by means of a SEEDS superpixel method.

Thus, the image processing system (1), in the next step (S3), may be configured to classify the segments (16) such that at least one segment feature (45) is first calculated from each segment (16). More specifically, the image processing system (1) may calculate the at least one segment feature (45) from the respective intensities (35) of the pixels (31) of the respective segments (16), and/or from the gray scale values of the pixels (31) of the respective segments (16).

The segment features (45) may comprise a lowest intensity of the respective segment (16), a highest intensity of the respective segment (16), a difference between the highest and lowest intensities (16) of the respective segment, a histogram of the respective segment (16), a horizontal intensity gradient of the respective segment (16), a vertical intensity gradient of the respective segment (16), a histogram of the vertical and/or horizontal intensity gradients (16), and/or at least one intensity mean value of the respective segment (16), in particular an arithmetical intensity mean value and/or an intensity median of the respective segment (16).

Further, the image processing system (1) may be configured to calculate a selection of segment features (16) from a gray scale matrix of the respective segment (16), in particular a homogeneity, an energy, a correlation and/or contrast of the gray scale matrix, wherein the gray scale matrix includes a frequency of a pairing of the intensity ranges and/or the gray scale ranges of two adjacent pixels (31) of the respective segment (16). The segment features (45) may comprise a vertical position in the segmented image (14) and/or a geometric center of gravity of the segment (16).

The image processing system (1), in the next step (S3), is configured to classify each segment (16) by means of the at least one calculated segment feature (45) into a classification (18) by means of a support vector machine, wherein the support vector machine is a mathematical method for classifying segments (16), and classified images (15) having classified segments (48) are generated. More specifically, a classification rating of the segment features (45) for the respective classifications (18) is determined in advance, and used to select the best segment features (45) for the support vector machine, and the support vector machine segment features (45) having a high classification rating, in particular having the highest classification rating, are used for classifying the segments (16), and in particular, the probabilities of a correct classification are calculated for each segment feature (45) and/or segment (16).

The image processing system (1), in the next step (S3), may be configured to post-process the classification after the segments (16) have been classified, wherein erroneous classifications (49) and/or classifications having low calculated probabilities are deleted, wherein numerous directly successive classified images (15) having classified segments (48) are compared in order to identify erroneous classifications (49), and classifications of segments (16) that only occur in a single classified image (15) are evaluated as erroneous. In one implementation, each classification (18) is assigned at least one segment feature.

The image processing system (1), in the subsequent step (S4), is configured to generate a further processable image data set (20) from the classified images (15) having the classified segments (48) by means of warping (51), stitching, and/or transfer into an occupancy grid (52). More specifically, the further processable image data set (20) may be consolidated with data sets of other sensors, in particular optical sensors (3), and further processed to form another further processable image data set (20).

Further, the data output unit (21) may be configured to make at least one of the further processable image data sets (20) available to other systems of an agricultural work machine (2), in particular a regulating and/or control unit, and in that the at least one further processable image data sets (20) can be used in particular to control the agricultural work machine (2) and/or its work organs. In addition, at least one of the further processable image data sets (20) can be used by the agricultural work machine (2) for environment recognition, in particular to identify anomalies (19) in the front area (9). The anomalies (19) may comprise obstacles (56) and/or irregularities in the crop (57), and are assigned to classifications (18), wherein irregularities in the crop (57) comprise cut grains (58), crop gaps (59), tracks (60), weeds (61) and/or crop edges, and obstacles (56) comprise low and/or high obstacles (62, 63), wherein low obstacles (62) can be bypassed by raising an attachment (22) without damaging the agricultural work machine (2), and high obstacles (63) require that the agricultural work machine (2) be steered around them.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

LIST OF REFERENCE SYMBOLS 1 image processing system
2 agricultural work machine
3 optical sensor
4 camera
5 radar sensor
6 laser scanner
7 image
8 environment
9 front area
10 range of the attachment
11 direction of travel
12 acquired images
13 preprocessed images
14 segmented images
15 classified images
16 segments
17 image analysis unit
18 classifications
19 anomalies
20 further processable image data set
21 data output unit
22 attachment
27 intensity standardization
28 color standardization
29 evaluation range
30 object
31 pixel
32 Bayer pixel pattern
33 reference image
34 reference object 35 intensity
44 classification limit
45 segment feature
47 multi-dimensional segment feature space
48 classified segment
49 erroneous classification
51 warping
52 occupancy grid
55 classification structure
56 obstacle
57 irregularities in the crop
58 cut grains
59 crop gaps
60 track
61 weeds
62 low obstacle
63 high obstacle
S1 first step
S2 further step
S3 next step
S4 subsequent step

The invention claimed is:

1. An agricultural work machine comprising:
an optical sensor configured to generate one or more images;
an image processing system in communication with the optical sensor and configured to:
store the one or more images generated by the optical sensor;
select an evaluation range based on a configuration of the agricultural work machine;
preprocess the one or more images by removing at least a part of the one or more images based on the evaluation range;
segment the preprocessed one or more images into segments;
classify the segments in order to identify one or more anomalies, wherein the one or more anomalies comprise one or more obstacles or one or more irregularities in a crop; and
generate a further processable image data set;
a control unit configured to:
receive the further processable image data set; and
control, based on the further processable image data set, at least a part of the agricultural work machine in order to perform at least one of: avoid the identified one or more anomalies; to drive in a track; or to stop the agricultural work machine.

2. The agricultural work machine of claim 1, wherein the agricultural work machine comprises an attachment;
wherein the image processing system is configured to preprocess the one or more images by selecting the evaluation range in the one or more images based on a width of the attachment; and
wherein the control unit is configured to, responsive to receiving the further processable image data set, raise the attachment over the identified one or more anomalies.

3. The agricultural work machine of claim 1, further comprising an output device configured to:
receive at least one of a warning or control instructions; and
output the at least one of the warning or control instructions to a vehicle operator.

4. The agricultural work machine of claim 1, wherein the image processing system is configured to select the evaluation range such that preprocessing results in the at least a part of the one or more images being removed as being more than a predetermined amount away from at least a part of the agricultural work machine.

5. The agricultural work machine of claim 4, wherein the image processing system is configured to preprocess the one or more images by:
determining whether an entirety of the one or more images are more than the predetermined amount away from the agricultural work machine; and
responsive to determining that the entirety of the one or more images are more than the predetermined amount away from the agricultural work machine, excluding the one or more images from further processing of segmenting, classifying, and generating the further processable image data set.

6. The agricultural work machine of claim 4, wherein the image processing system is configured to preprocess the one or more images by:
determining a speed of the agricultural work machine;
selecting, based on the determined speed of the agricultural work machine, the predetermined amount away from the agricultural work machine; and
using the selected predetermined amount away from the agricultural work machine in order to remove the at least a part of the one or more images.

7. The agricultural work machine of claim 6, wherein the predetermined amount away from the agricultural work machine comprises a specific distance, in a direction of travel, from the agricultural work machine;
wherein the image processing system is configured to select the specific distance based on the speed of the agricultural work machine; and
wherein the image processing system is configured to remove the at least a part of the one or more images that is more than the specific distance, in the direction of travel, from the agricultural work machine.

8. The agricultural work machine of claim 7, wherein the predetermined amount away from the agricultural work machine comprises both the distance in a direction of travel from the agricultural work machine and a specific width;
wherein the image processing system is configured to select the specific width based on the speed of the agricultural work machine; and
wherein the image processing system is configured to remove the at least a part of the one or more images that is more than the specific distance, in the direction of travel, from the agricultural work machine and outside of the specific width.

9. The agricultural work machine of claim 1, wherein the image processing system is configured to segment the preprocessed one or more images, using a superpixel method that avoids renewed growing of superpixels and displaces only edges of the superpixels, into the segments with pixels having similar colors and intensities.

10. The agricultural work machine of claim 1, wherein the image processing system is configured to consolidate data for each pixel for a respective segment into a single value for the respective segment; and
wherein the image processing system is configured to classify the respective segment based on the single value.

11. The agricultural work machine of claim 1, wherein the image processing system is further configured to calculate at least one segment feature for each segment based on a homogeneity, an energy, a correlation, or contrast of a gray scale matrix of the respective segments; and wherein the image processing system is configured to classify the segments based on the calculated at least one segment feature from each segment.

12. The agricultural work machine of claim 11, wherein the gray scale matrix includes a frequency of a pairing of intensity ranges or gray scale ranges of two adjacent pixels of the respective segment.

13. The agricultural work machine of claim 1, wherein the image processing system is further configured, after classifying the segments, to:
compare classified segments of directly successive classified images in order to identify erroneous classifications; and
delete at least some classifications based on classifications of segments that only occur in a single classified image.

14. An agricultural work machine, comprising:
an optical sensor configured to generate one or more images;
an image processing system in communication with the optical sensor and configured to:
store the one or more images generated by the optical sensor;
preprocess the one or more images by performing intensity standardization by:
determining a pixel-specific intensity correction factor for each pixel using at least one reference image; and correcting intensity of each pixel of the one or more images with the pixel-specific intensity correction factor;
segment the preprocessed one or more images into segments;
classify the segments in order to identify one or more anomalies, wherein the one or more anomalies comprise one or more obstacles or one or more irregularities in a crop; and
generate a further processable image data set;
a control unit configured to:
receive the further processable image data set; and
control, based on the further processable image data set, at least a part of the agricultural work machine in order to perform at least one of: avoid the identified one or more anomalies; to drive in a track; or to stop the agricultural work machine.

15. An agricultural work machine, comprising:
an optical sensor configured to generate one or more images;
an image processing system in communication with the optical sensor and configured to:
store the one or more images generated by the optical sensor;
preprocess the one or more images by performing color standardization by: determining an intensity correction value for each color channel of the one or more images; and correcting intensities of pixels of each color channel in a uniform manner by the intensity correction value;
segment the preprocessed one or more images into segments;
classify the segments in order to identify one or more anomalies, wherein the one or more anomalies comprise one or more obstacles or one or more irregularities in a crop; and
generate a further processable image data set;
a control unit configured to:
receive the further processable image data set; and
control, based on the further processable image data set, at least a part of the agricultural work machine in order to perform at least one of: avoid the identified one or more anomalies; to drive in a track; or to stop the agricultural work machine.

16. The agricultural work machine of claim 15, wherein the image processing system is configured to determine the intensity correction value by:
determining a difference between measured respective intensities of color pixels assigned to a respective color channel of a reference object having a known color in the one or more images and known respective intensities of the color pixels of the reference object having a known color in the one or more images assigned to the respective color channel.

17. The agricultural work machine of claim 16, wherein the image processing system is configured to determine the measured respective intensities by averaging a selection of color pixels of the reference object having a known color.

18. An agricultural work machine comprising:
an optical sensor configured to generate one or more images;
an image processing system in communication with the optical sensor and configured to:
store the one or more images generated by the optical sensor;
preprocess the one or more images by performing at least one of an intensity standardization, a color standardization, or a selection of an evaluation range in the one or more images;
segment the preprocessed one or more images into segments with pixels of equal or similar color or intensity;
classify the segments using a support vector machine in order to identify one or more anomalies, wherein the support vector machine comprises a mathematical model for classifying the segments in order to identify classified images with the one or more anomalies, wherein the one or more anomalies comprise one or more obstacles or one or more irregularities in a crop; and
generate a further processable image data set based on the classified images;
a control unit configured to:
receive the further processable image data set; and
control, based on the further processable image data set, at least a part of the agricultural work machine in order to perform at least one of: avoid the identified one or more anomalies; to drive in a track; or to stop the agricultural work machine.

19. The agricultural work machine of claim 18, wherein the image processing system is configured to preprocess the one or more images by selecting an evaluation range in the one or more images based on a configuration of the agricultural work machine.

20. The agricultural work machine of claim 19, wherein the image processing system is configured, in classifying the segments, to:
use a previously determined classification rating of segment features for respective classifications in order to determine a plurality of classification ratings for support vector machine segment features for the respective segments, the plurality of classification ratings comprising probabilities of a correct classification for each segment feature; and
select a best segment feature, from the plurality of classification ratings based on a highest classification rating, for the support vector machine.

* * * * *